UNITED STATES PATENT OFFICE.

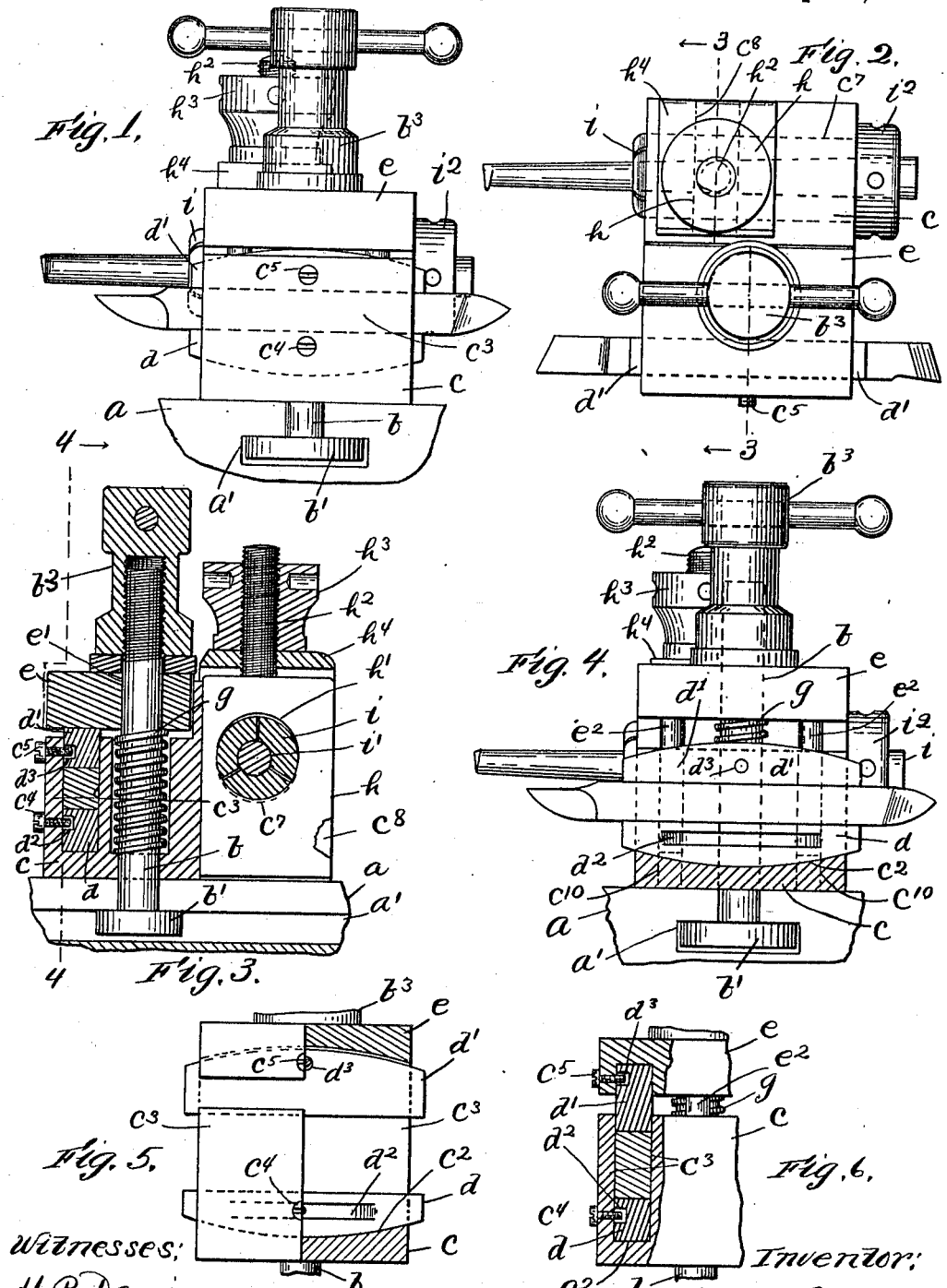

HENRI HALDY, OF WALTHAM, MASSACHUSETTS, ASSIGNOR TO JOHN STARK, OF WALTHAM, MASSACHUSETTS.

TOOL-POST FOR LATHES.

970,219.  Specification of Letters Patent.  Patented Sept. 13, 1910.

Application filed April 18, 1910. Serial No. 556,190.

*To all whom it may concern:*

Be it known that I, HENRI HALDY, of Waltham, in the county of Middlesex and State of Massachusetts, have invented an Improvement in Tool-Posts for Lathes, of which the following is a specification.

This invention relates to tool-posts for lathes, and has for its object to construct a tool-post whereby the clamping-jaws are attached to the tool-post and the upper jaw permitted to rock and the lower jaw permitted to move longitudinally, to thereby provide for holding a tool at any desired angle, the lower clamping-member of the tool-post having a recess, extending from end to end of it, of a depth to receive the jaws and the tool held by them, and of a width corresponding to the width of the jaws and tool held by them, whereby said jaws and tool are supported at both sides by the front and back walls of said recess.

The invention also has for its object to provide a tool-post with means for supporting a boring-tool at different angles with respect to the slide-rest on which the tool-post is supported.

Figure 1 is a front elevation of a tool-post for lathes embodying this invention, Fig. 2 is a plan of the tool-post, Fig. 3 is a vertical section taken on the dotted line 3—3, Fig. 2, Fig. 4 is a vertical section taken on the dotted line 4—4, Fig. 3, Figs. 5 and 6 are details of a modified form of tool-holder arranged on the tool-post.

Referring to the drawing, $a$ represents the slide-rest of an ordinary bench-lathe, having the usual ways $a'$. A vertical supporting-pin $b$ is provided for the tool-post, having at its lower end a head $b'$, which enters the ways $a'$ of the slide-rest $a$, and is adapted to slide therein. The pin $b$ extends above the slide-rest to support the tool-post.

The tool-block $c$, which forms the lower clamping-member of the tool-post, is adapted to rest on the slide-rest $a$, and has a vertical hole $c'$ through it for the pin $b$. The tool-block $c$ has a recess $c^2$ extending transversely from end to end of it, which is made of a depth sufficient to receive both the lower and upper clamping-jaws $d$, $d'$, and also a tool which may be placed between them and of a width corresponding to the width of said jaws and tool. The clamping-jaws $d$, $d'$, have convex sides opposite their gripping faces, and the lower or bottom wall of the recess $c^2$ is made concave on an arc corresponding to the convex side of the jaw $d$, so as to support said jaw for substantially its entire length in all the different positions it may occupy. For holding the jaw $d$ in the recess $c^2$ the front wall $c^3$ of said recess is tapped to receive a screw $c^4$, which extends through said wall, and enters a slot $d^2$ formed in the outer side of the jaw $d$. The slot $d^2$ is made of a width greater than the diameter of the screw, and of a depth sufficient to prevent the screw from bottoming therein. The slot $d^2$ extends only along the intermediate portion of the jaw $d$, so that the jaw $d$ is permitted to slide longitudinally in the recess in the block, to allow proper adjustment of the tool. The screw $c^4$ limits longitudinal movement in both directions and prevents displacement of the jaw. The upper clamping-jaw $d'$, which is also contained in the recess in the block $c$, and is held in place by a screw $c^5$, which passes through the front wall $c^2$ of said recess and enters a hole $d^3$ in said jaw, said hole being of larger diameter than the screw, to permit movement of said jaw. The front and back side-walls $c^3$, $c^3$, of the recess $c^2$, support and prevent any lateral movement of the jaws and also of the tool which is held by them, which is of great advantage in a tool-holder of this class.

The upper clamping-member $e$, of the tool-post, is made as a plate, and has a vertical hole $e'$ through it, of a diameter to slide freely on the supporting-pin $b$, and said pin extends up through said hole and is screw-threaded at its upper end to receive upon it a clamping-nut $b^3$, a washer being interposed between the nut $b^3$ and the upper side of the member $e$, if desired. A helical spring $g$ is arranged on the pin $b$, the lower end of which rests on the bottom of a recessed portion of the hole $e'$ in the tool-block, and the upper end of which bears against the clamping-member $e$, pressing said member $e$ against the nut $b^3$. One or more guide-pins $e^2$, $e^2$, extend downward from the plate $e$ and enter vertical holes $c^{10}$, $c^{10}$, in the tool-block $c$, thus insuring the alinement of the two clamping-members.

When a tool is interposed between the jaws, $d$, $d'$ the jaws will readily adjust themselves to any inclination the tool may be set, this being permitted by the sliding movement of the lower jaw $d$. The upper jaw $d'$, being loosely held in the recess $c^2$ by the screw $c^5$, will rest on the tool, and its upper convex side will in all positions present to the clamping-member $e$ a bearing surface in line with the center of the clamping-members. The tool, having been placed between the jaws and set at the desired angle, the clamping-nut $b^3$ is turned down, and the member $e$ forced downward on to the convex side of the jaw $d'$, and both jaws and tool forced downward against the bottom wall of the recess $c^2$, thus clamping them firmly. The turning down of the clamping-nut $b^3$ will also tend to draw the pin $b$ upward, causing the head $b'$ thereof to engage the under sides of the ways $a'$, thus holding the tool-block firmly in any position it may occupy on the slide-rest $a$. The tool-block $c$ is also arranged to support another tool-holder. As here shown, a longitudinal cylindrical hole $c^7$ extends through said tool-block $c$, and a vertical slot $c^8$ is formed at a right angle to said hole $c^7$, said slot extending from top to bottom of the tool-block and made of a depth sufficient to intersect the hole $c^7$.

An upright plate $h$, having a hole $h'$ through it corresponding with the diameter of the hole $c^7$, is contained in and adapted to slide vertically in the slot $c^8$, and, when in its lowermost position, the holes $c^7$ and $h'$ are adapted to register. A split-chuck $i$ extends at least the entire length of the said hole $c^7$, and through the hole with sliding-plate $h$, and is of a corresponding diameter. The chuck has a bore $i'$ adapted to receive a tool having a round shank-portion, and said bore $i'$ is made eccentric to the hole $c^7$, and adjustment of the tool can be obtained by turning the chuck $i$ in the hole, a suitable head $i^2$ being provided on the chuck for the purpose of turning it.

For clamping the tool in place the sliding-plate $h$ has a screw-threaded projection $h^2$, extending up through a hole in a plate $h^4$, which is mounted on the tool-block $c$ and extends across the slot $c^8$, and said projection $h^2$ receives upon it a clamping-nut $h^3$, which engages the plate $h^4$, and as it is turned down draws up the sliding-plate $h$, clamping and compressing the chuck between the top of the hole $c^7$ and the bottom of the hole $h'$.

Referring to Figs. 5 and 6, the upper jaw $d'$ is shown as supported on the upper clamping-member $e$. This permits the use of tools of varying widths, but when supported on the upper clamping-member, the jaw must be made of sufficient depth so that its lower edge will always remain in the recess $c^2$ of the block, so as to engage and be supported by the front and back walls thereof, which is one of the important features of my invention.

I claim:

1. A tool-post for lathes comprising a lower clamping-member having a recess extending from end to end of it, upper and under clamping-jaws, both contained in said recess, separate means arranged on the front wall of said recess for loosely engaging each jaw, permitting a rocking movement of the upper jaw and a longitudinal movement of the lower jaw, and disposed to hold said jaws sufficiently remote from each other to receive a tool between them, said recess in the lower clamping-member being of a width corresponding to the width of the jaws and of the tool which is held by them, and an upper clamping-member movable into engagement with the upper clamping-jaw, substantially as described.

2. A tool-post for lathes comprising a lower clamping-member and an upper clamping member movable toward and from the lower clamping-member, an upper clamping jaw and a lower clamping jaw, the lower clamping-member having a recess extending from end to end of it, of a depth sufficient to receive both jaws and a tool between them, and of a width corresponding to the width of the jaws and of a tool held by them, whereby said jaws and tool are supported by the front and back walls of said recess, substantially as described.

3. A tool-post for lathes comprising a lower clamping-member and an upper clamping-member movable toward and from the lower clamping-member, an upper clamping jaw having a hole in its front side and an attaching-screw for said jaw which enters and loosely fits said hole, whereby said jaw is free to rock, and a lower clamping-jaw having a slot in its front side, extending along its intermediate portion only, and an attaching-screw for said jaw, which enters and loosely fits said slot, whereby said lower clamping-jaw is free to move longitudinally, substantially as described.

In testimony whereof, I have signed my name to this specification, in the presence of two subscribing witnesses.

HENRI HALDY.

Witnesses:
 SUSAN S. MCCLARY,
 ROBERT M. STARK.